(12) United States Patent
Schroeder et al.

(10) Patent No.: US 8,075,677 B2
(45) Date of Patent: Dec. 13, 2011

(54) CARBON CANISTER WITH VALVE ACTIVATED BY WEIGHT OF SATURATED CARBON

(75) Inventors: Timothy Schroeder, Maryland Heights, MO (US); Darrell Vilmer, Florissant, MO (US); Arthur C. Fink, Jr., Lonedell, MO (US)

(73) Assignee: Husky Corporation, Pacific, MO (US)

( * ) Notice: Subject to any disclaimer, the term of this patent is extended or adjusted under 35 U.S.C. 154(b) by 472 days.

(21) Appl. No.: 12/322,414

(22) Filed: Feb. 2, 2009

(65) Prior Publication Data
US 2009/0173231 A1 Jul. 9, 2009

Related U.S. Application Data

(63) Continuation-in-part of application No. 11/500,211, filed on Aug. 7, 2006, now Pat. No. 7,578,872.

(60) Provisional application No. 60/797,599, filed on May 4, 2006.

(51) Int. Cl.
*B01D 53/02* (2006.01)

(52) U.S. Cl. ............... 96/143; 96/113; 96/114; 96/116; 96/144; 95/141; 95/143; 95/144; 95/146; 95/148

(58) Field of Classification Search ............ 96/113–114, 96/116, 143–144; 95/141, 143–146, 148
See application file for complete search history.

(56) References Cited

U.S. PATENT DOCUMENTS

| 4,462,811 | A | 7/1984 | Dinsmore et al. |
| 5,154,735 | A | 10/1992 | Dinsmore et al. |
| 5,305,807 | A | 4/1994 | Healy |
| 5,345,771 | A | 9/1994 | Dinsmore et al. |
| 5,529,614 | A | 6/1996 | Engler et al. |
| 5,951,741 | A | 9/1999 | Dahl et al. |
| 6,486,375 | B1 | 11/2002 | Lenhart et al. |
| 6,736,871 | B1 | 5/2004 | Green et al. |
| 7,011,119 | B2 | 3/2006 | Fink, Jr. |
| 7,578,872 | B2 | 8/2009 | Fink, Jr. |
| 2004/0000338 | A1 | 1/2004 | Heiderman |
| 2007/0131111 | A1 | 6/2007 | Hart |
| 2009/0056827 | A1 | 3/2009 | Tschantz |

FOREIGN PATENT DOCUMENTS

| AU | 630012 | 3/1991 |
| CA | 2021702 | 3/1990 |

*Primary Examiner* — Jason M Greene
*Assistant Examiner* — Karla Hawkins
(74) *Attorney, Agent, or Firm* — Paul M. Denk (57) ABSTRACT

A carbon canister with a valve activated by the weight of nearly saturated or saturated carbon communicates with piping from an underground tank. The invention includes carbon within a casing inside a canister, a weight actuated valve, and piping in communication with the atmosphere. When an ORVR vehicle refuels, the pressure lowers in the tank that draws air into the canister. After refueling, the tank remains subject to conditions that generate hydrocarbon vapors. Those vapors then return to the canister and adhere to the surface of the carbon. The carbon, heavier with hydrocarbons, lowers the canister and closes the weight actuated valve. Closing the valve returns pressure control to an external pressure vacuum relief valve. The next refueling draws in atmospheric air to purge the hydrocarbons in the canister and thus lighten it. A secondary purge valve also removes hydrocarbons from the canister. Once the carbon lightens, the inlet valve opens and the vapors return to the canister for adsorption. This cycle regenerates the carbon.

10 Claims, 10 Drawing Sheets

CARBON CANISTER WITH VALVE ACTIVATED BY WEIGHT OF SATURATED CARBON

CROSS-REFERENCE TO RELATED APPLICATION

This continuation-in-part application claims priority to the non-provisional application having Ser. No. 11/500,211 which was filed on Aug. 7, 2006 now U.S. Pat. No. 7,578,872, and which claims priority to the provisional patent application having Ser. No. 60/797,599, which was filed on May 4, 2006.

Also, this non-provisional patent application is related to the non-provisional patent application having Ser. No. 11/043,526, which was filed on Jan. 26, 2005 (now U.S. Pat. No. 7,011,119), which claims priority to the provisional application having Ser. No. 60/539,848, which was filed on Jan. 28, 2004

BACKGROUND OF THE INVENTION

The carbon canister with valve activated by weight of saturated carbon relates to underground fuel storage tank vapor recovery, in general, and more specifically, to the capture and purging of hydrocarbon vapors as released from an underground storage tank during fueling by ORVR vehicles. A unique aspect of the present invention is transfer of underground storage tank pressure control from the carbon canister to a pressure vacuum valve at a pressure reading of approximately at least 0.25 inches of water.

Fuel storage tanks, such as underground storage tanks, UST, used to store fuel at gasoline dispensing facilities or GDF, are subject to variable pressures that affect the ability of the fueling system and vapor recovery system to operate correctly. The fuel storage tanks thus have one or more vents which release the excess pressure when the tank exceeds a predetermined maximum pressure. Excess pressure can be caused by vacuum assisted refueling when more vapors are drawn into the tank than volume of fuel dispensed, by not connecting the vapor return hose to the transfer tank when refueling the tank, or by local atmospheric conditions, particularly barometric pressure changes associated with weather. Additionally, negative pressure, or partial vacuums, can appear in the storage tank by dispensing more fuel than vapors that are drawn into the tank as during vacuum assist, or balance system, refueling. In that situation, the tank requires additional pressure, or more likely the vacuum must be dissipated.

Since the 1998 automotive model year, onboard refueling vapor recovery, ORVR, technology has been employed initially on passenger cars and presently on light trucks. As is well known, the motorist refuels a vehicle at a service station. The fuel is pumped from an underground tank, by the dispenser, through a hose and nozzle, for filling the vehicle fuel tank. Normally, the vapors generated within the fuel tank, through refueling, are returned through the vapor path of the fuel hose, back to the dispenser, either by the balanced pressure method—called Stage II vapor recovery—or by a pump, and then are returned to the underground storage tank for containment.

Escaped gasoline vapors raise pollution concerns and trigger governmental regulations. Hydrocarbon vapors, such as octane, under the action of sunlight form ground level ozone. Such ozone affects the respiratory tract in humans. Normally, balance type Stage II vapor recovery stations operate at a negative pressure except during closure of the station. When an ORVR equipped vehicle is refueled, the ORVR system retains the vapors from the vehicle fuel tank, and does not return the vapors to the dispensing system, often lowering the pressure within the fuel storage tank. An ORVR vehicle refueling at a Stage II equipped station imposes a negative pressure on the Stage II system that draws some atmospheric air into an underground fuel tank. The atmospheric air then absorbs hydrocarbon vapors released from stored fuel and with each ORVR vehicle that refuels, the pressure in the underground tank decreases. When that pressure exceeds a limit, valves release the air containing hydrocarbons from the tank to the atmosphere thus, contributing to pollution when attempting to avoid it.

Generally, various methods capture gasoline vapors and then return them to the underground tank. In doing so, the vapor recovery systems prevent vapors from escaping to the atmosphere as components of pollution. Vapor recovery systems are of two types. First, the vacuum assist system utilizes the partial vacuum created within the nozzle, by means of the flowing fuel passing through the nozzle during its dispensing, or a vacuum pump, and this partial vacuum tends to attract vapors back into the nozzle, either through a bellows arrangement used in conjunction with the nozzle spout, or through a passage created between concentrically arranged nozzle spouts, that allows the partial vacuum to attract the vapors back into the spout for return to the underground storage tank. Second, the balanced pressure system begins upon pumping gasoline into an automobile fuel tank, then displaced vapors are forced back towards the emplaced nozzle that captures gasoline vapors for return back into the vapor line and eventually to the underground storage tank.

Prior art designs defeat pressurization and vapor absorption in the underground fuel tank by two classes of devices. First, nozzles and other parts of the dispensing system are regulated by an ORVR detecting sensor. The sensor recognizes the pressure dip caused by an ORVR vehicle and promptly reduces air ingestion to less than the volume of fuel dispensed. The sensor and nozzles result in a slight negative pressure in the underground tank that limits vapor loss to the atmosphere. Second, membranes and condensing processes control the vapor at the source, in the underground fuel tank. The membranes and condensing processes cool or otherwise liquefy gasoline vapors and return them to the underground tank while letting cleansed air return to the atmosphere. Though collecting vapors, the prior art required additional mechanical equipment, and has higher installation and operational costs, and energy consumption.

The patent to Healy, U.S. Pat. No. 5,305,807, describes a vapor recovery device. This device has a vacuum pump connected to underground storage tanks coupled with a solenoid. A pressure switch monitors pressure in the UST and energizes the solenoid to move valves within three conditions to direct air flow into or out of the UST. The valves control flow of hydrocarbons and air through a conduit system. This patent discloses a pump and solenoid not in the present invention.

Additionally, the California Air Resources Board "CARB" has imposed Enhanced Vapor Recovery upon equipment used at gasoline dispensing facilities. The Assignee has developed an activated carbon canister with an internal pressure control system for a UST. The internal pressure control system goes by the name of a vapor processor according to CARB. In a typical UST, a pressure vacuum valve vents the pressure and hydrocarbon emissions from a UST when the pressure reading exceeds 2.5 inches of water. However, some vapor processors can release hydrocarbons at pressure exceeding 0.25 inches of water. The order of magnitude reduction in pressure has concerned CARB that more hydrocarbons will be emitted by vapor processors and that the pressure vacuum valves will be bypassed and no longer serve their function at suitable pressure levels. Additionally, CARB seeks the pressure vacuum valve to operate in the event of a vapor processor failing. Existing vapor processors do not provide a mechanism or method to transfer pressure control from the vapor processor back to the pressure vacuum valve.

The present art overcomes the limitations of the prior art. That is, the present invention, a canister of activated carbon with a valve actuated by the weight of saturated carbon provides a mechanical closing of an inlet valve returning pressure control to the pressure vacuum valve. The present invention returns pressure control before or when it is saturated with hydrocarbon vapors thus allowing the pressure vacuum valve to regulate hydrocarbon vapors that accumulate before or beyond saturation at less than 2.5 inches of water pressure.

Thus, prior art devices do not provide for storing purged hydrocarbon vapors within a container and preventing their return into an underground fuel tank while allowing air to pass freely through the container. The present invention uses the heavier weight of carbon saturated with hydrocarbons as an input to close a valve. The present invention does not require electrical power or an external control to actuate.

SUMMARY OF THE INVENTION

A carbon canister with a valve activated by the weight of saturated carbon contained therein connects and communicates with piping from an underground tank. The present invention includes a canister, a casing inside the canister, carbon within the casing, preferably activated carbon, and various valves and piping in communication with the atmosphere. When an ORVR vehicle refuels, the pressure lowers in an underground tank that draws air through the valves into the canister. After refueling an ORVR vehicle, the underground tank remains subject to environmental conditions that generate hydrocarbon vapors, such as octane $C_8H_{18}$. Barometric pressure drops and evaporated fuel during long refueling lulls produce hydrocarbon vapors at an increased pressure. Those hydrocarbon rich vapors then return to the canister where the activated carbon binds the hydrocarbons while releasing air to the atmosphere. The activated carbon, now heavier with hydrocarbons, sinks lower in the canister and closes a valve. Closing the valve keeps the remaining hydrocarbon vapors in the UST. The refueling of more ORVR vehicles draws in atmospheric air through a bypass to purge the hydrocarbons retained in the canister and thus lighten the carbon. Once the activated carbon lightens enough in weight, the valve opens and hydrocarbon vapors return to the canister for adsorption. Unlike absorption where the hydrocarbon molecules bond to the carbon atoms, adsorption utilized in the present invention provides carbon upon which hydrocarbon molecules temporarily adhere without bonding to the carbon atoms. This cycle of hydrocarbon vapor binding and purging, regenerative carbon adsorption, continues with each ORVR vehicle.

Therefore, it is an object of the invention to provide a carbon canister with weight actuated valve capable of removing hydrocarbons from vapors evacuated from an underground fuel tank.

It is another object of the carbon canister with weight actuated valve to collect hydrocarbon laden vapors by pressure increases within an underground fuel tank.

It is another object of the carbon canister with weight actuated valve to collect atmospheric air into the canister by pressure decreases within an underground fuel tank.

It is another object of the carbon canister with weight actuated valve to purge collected hydrocarbon vapors by passing atmospheric air through the canister as it is discharged back into the atmosphere.

It is another object of the carbon canister with weight actuated valve to operate independent of electrical or mechanical power.

It is another object of the carbon canister with weight actuated valve to permit ready inspection and changing of the activated carbon placed within the canister.

It is another object of the carbon canister with weight actuated valve to encourage prompt and accurate manual and automatic adjustment in response to pressure fluctuations.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing a carbon canister and appurtenant valves and controls to cleanse hydrocarbon vapors from air released from an underground storage tank during ORVR refueling. At service stations, ORVR equipped vehicles refuel, often inducing negative pressure upon an UST that draws in atmospheric air which blends with hydrocarbons in the UST. When the UST reaches a high enough pressure, relief valves open and vent the hydrocarbon laden air from the UST to the atmosphere.

Figure 1:
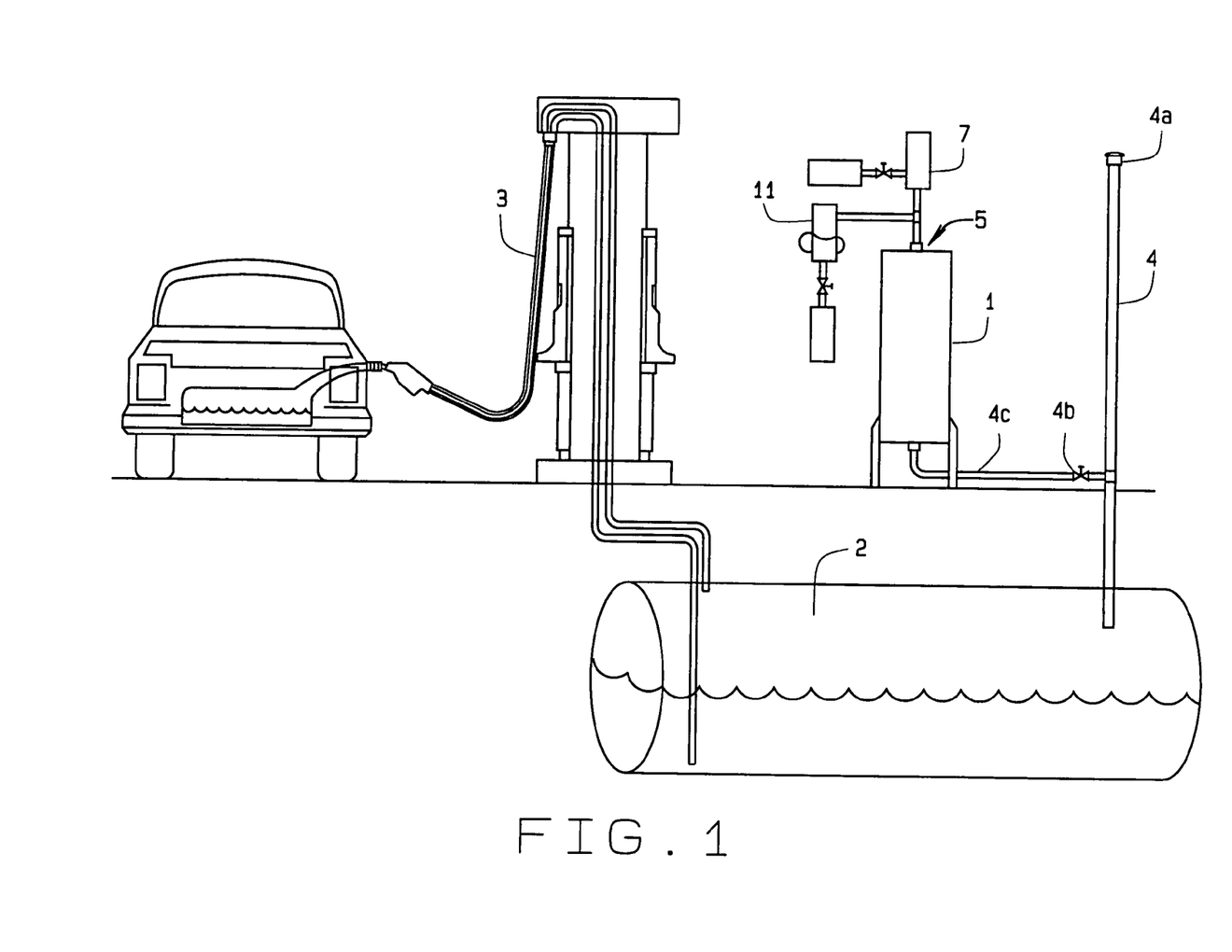
FIG. 1 illustrates a gasoline station where a vehicle refuels from an underground tank connected to a vapor recovery system constructed in accordance with the principles of the present invention.

In referring to FIG. 1, an embodiment of the canister 1 of the vapor pressure management system for vapor recovery is shown connected to an UST 2 in a refueling system 3. The UST has a vent stack 4 with an inlet generally above the maximum fill line of the UST and here shown away and to the right of the canister of the invention. The vent stack then communicates to the canister 1 and retains an emergency pressure relief valve 4a. A shutoff valve 4b of the ball type is in the line from the vent stack to the canister. The line then connects to the canister. Opposite the line from the UST, the canister has a canister inlet 5. The inlet has regulated communication with the atmosphere. The inlet receives atmospheric air under certain conditions or discharges air from the line under other conditions. The inlet may have threading for connection to additional piping or a vent cap, not shown.

Figure 2:
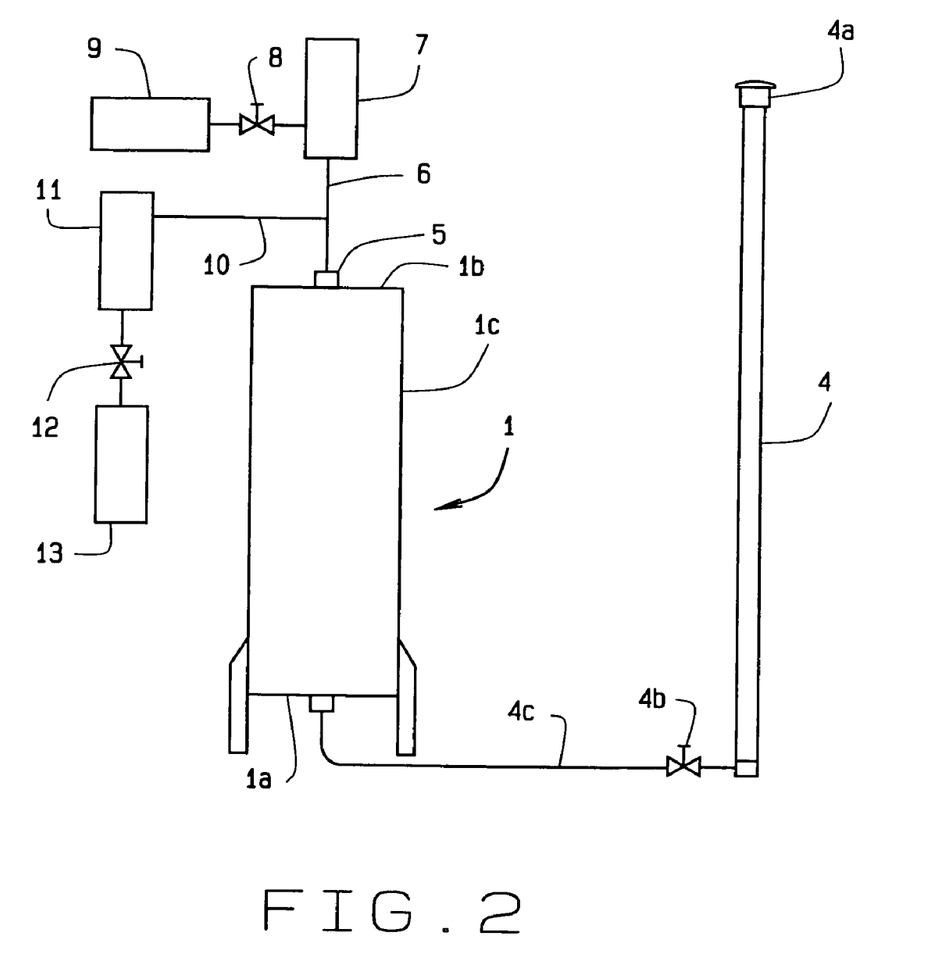
FIG. 2 shows a detailed view of the carbon canister and appurtenant valves and control mechanisms.

FIG. 2 shows the present invention in more detail. The canister 1 has a generally cylindrical shape, here shown upright. The canister has a bottom 1*a* and an opposite top 1*b*. The bottom and the top have openings to permit communication to the UST line 4*c* and the inlet 5 respectively. Though a cylindrical shape is described, alternative shapes of the canister, rectangular, round, spherical, conic and the like are anticipated. The canister has a wall 1*c* that connects with the perimeters of the top and the bottom to surround the canister. The canister contains activated carbon in dry form, generally filling the canister. The activated carbon has been specially processed to provide increased levels of hydrocarbon adsorption per weight of carbon. Alternatively, the canister contains activated charcoal in an aqueous solution.

The inlet 5 then proceeds to its first branch control 6. The first branch control communicates to the atmosphere for drawing in air through the canister to the UST. The first branch control has a vacuum regulator 7 in communication with a valve 8 that connects with a screened intake 9. The intake 9 admits atmospheric air into the canister generally at a low pressure and when the vacuum regulator 7 opens.

The inlet 5 has a second branch control 10. The second branch control releases treated air from the canister to the atmosphere. The second branch control has a pressure regulator 11 in communication with a valve 12 that then connects with a screened exhaust or outlet 13. The outlet 13 is hereby shown below the intake 9 however, other locations of them are anticipated.

To utilize the invention, an operator connects the UST line 4*c* to the bottom 1*a* of the canister 1. Then the inlet 5 is connected to the top 1*b* and the first branch control 6 and the second branch control 10 are connected to the inlet 5. In operation, the canister communicates with the UST. After a few refuelings, the pressure drops in the UST and in the line 4*c* and thus in the canister 1. The vacuum regulator 7 detects the pressure drop and opens to admit air from the intake 9 into canister 1 and then into the line 4*c*. The air passing through the carbon of the canister strips any hydrocarbons therein and returns them to the UST. Once the pressure stabilizes in the UST, the vacuum regulator closes, stopping the inflow of air into the canister.

After additional refuelings, barometric pressure changes, and like events, the UST accumulates hydrocarbons under higher pressure. The higher pressure affects the canister of the vapor pressure management system and the pressure regulator 11 opens at a certain pressure. The open second branch control 10 draws hydrocarbon laden air from the UST through the canister. The carbon in the canister strips the hydrocarbons from the UST air and retains them upon the carbon. The cleansed air is then released from the outlet 13. Once the pressure again stabilizes in the UST, the pressure regulator closes the second branch control.

If the canister of the system clogs or otherwise fails and the UST pressure increases severely, the vent 4 has a pressure relief valve 4*a* that opens. Opening of this valve is anticipated on the order of a handful of hours per year. The cycle of purging and retaining hydrocarbons then repeats until the carbon is exhausted. The carbon exhausts after some years and requires replacement. The present invention permits ready replacement of the activated carbon, or other form of carbon within the canister. In operation, the present invention maximizes the air introduced into the UST and minimizes any hydrocarbons released from the UST.

Figure 3:
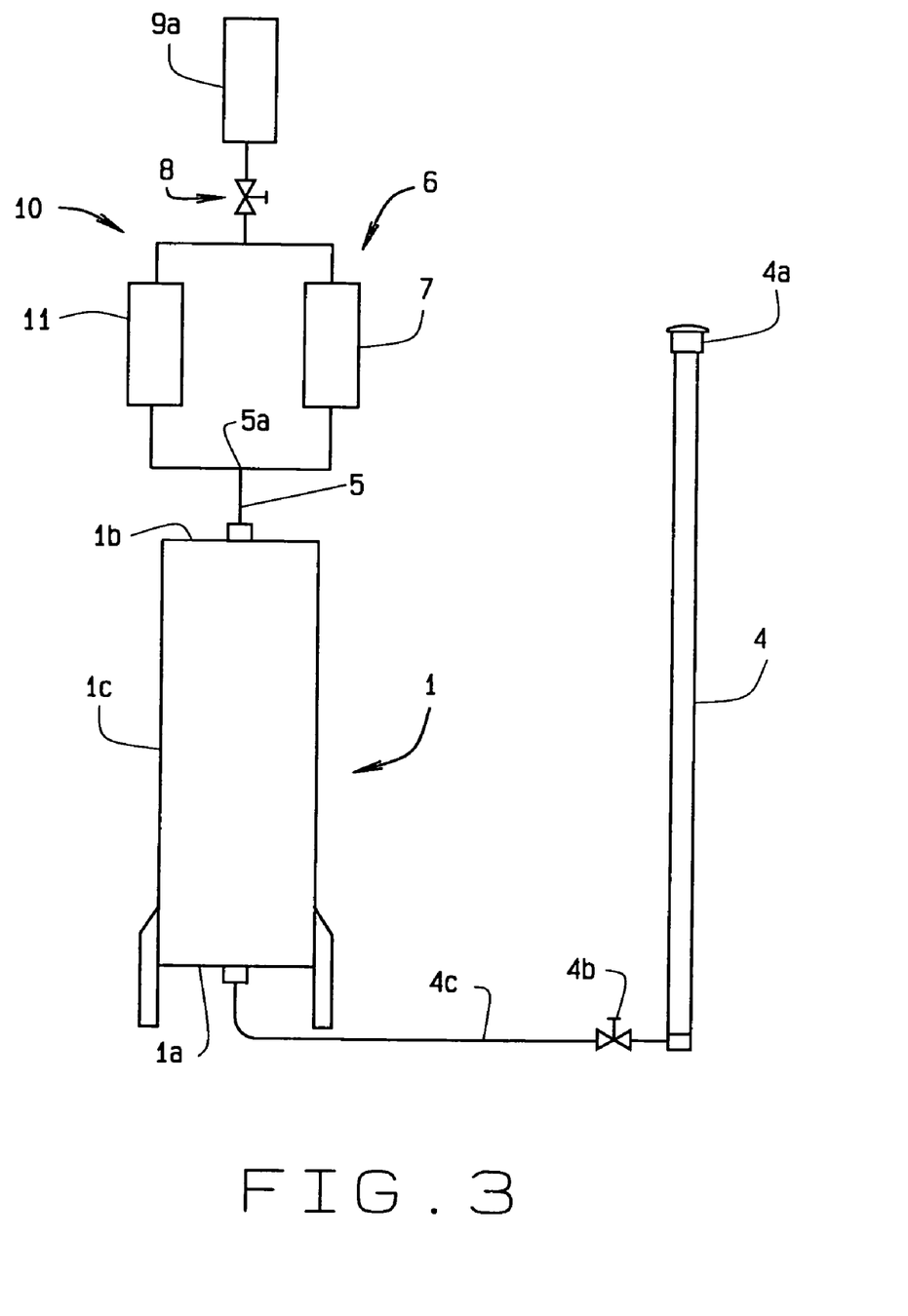
FIG. 3 describes a detailed view of the canister in an alternate embodiment of the present invention.

FIG. 3 shows an alternate embodiment of the present invention with both branch controls communicating to the atmosphere through the same intake. As before, the canister 1 has a generally cylindrical shape, here shown upright, with a bottom 1*a* and an opposite top 1*b*. The bottom and the top have openings to permit communication to the UST line 4*c* and the inlet 5 respectively. The canister has a wall 1*c* that connects with the perimeters of the top and the bottom to surround the canister. The canister contains activated charcoal and other carbon materials in dry form, generally filling the canister. Alternatively, the canister contains activated charcoal suspended within an aqueous solution.

The inlet then proceeds to a tee 5*a* that joins both branch controls. The first branch control, as at 6, communicates to the atmosphere for drawing air through the intake 9*a*, into the canister, and onwards to the UST. The first branch control has a vacuum regulator 7 in communication with a valve 8 that connects with a screened intake 9*a*. The intake 9*a* admits atmospheric air into the canister generally at a low pressure and when the vacuum regulator 7 opens.

From the tee 5*a* in the opposite direction, the inlet 5 has a second branch control 10. The second branch control releases treated air from the canister to the atmosphere. The second branch control has a pressure regulator 11 in communication with the valve 8 that then connects with the screened intake 9*a*. The screened intake 9*a* in the alternate embodiment both admits atmospheric air into the canister and releases cleansed air from the canister. Though the screened intake serves dual functions, the opposing functions of the vacuum regulator 7 and the pressure regulator 11 prevent recirculation of hydrocarbon vapors.

Similar to before, an operator connects the UST line 4*c* to the bottom 1*a* of the canister 1 to operate the invention. Then the inlet 5 is connected to the top 1*b* and the first branch control 6 and the second branch control 10 are connected to the inlet 5 through the tee 5*a*. In operation, the present invention communicates with the UST. After a few refuelings, the pressure drops in the UST and in the line 4*c* and thus in the canister 1. The vacuum regulator 7 detects the pressure drop and opens to admit air from the intake 9*a*, through the valve 8, and into canister 1 and then into the line 4*c*. The air passing through the charcoal carbon of the canister strips any loose hydrocarbons therein and returns them to the UST. Once the pressure stabilizes in the UST, the vacuum regulator closes, stopping the inflow of air into the canister.

After additional refuelings, barometric pressure changes, and like events, the UST accumulates hydrocarbons under higher pressure. The higher pressure affects the canister of the vapor pressure management system and the pressure regulator 11 opens at a certain pressure. The open second branch control 10 draws hydrocarbon laden air from the UST through the canister. The activated carbon in the canister strips the hydrocarbons from the UST air and retains them upon the activated carbon. The cleansed air is then returned from the canister through the pressure regulator out the intake 9*a* and then to the atmosphere. Once the pressure again stabilizes in the UST, the pressure regulator closes the second branch control.

If the canister of the system clogs or otherwise fails and the UST pressure increases severely, the vent 4 has a pressure relief valve 4*a* that opens. Opening of this valve is anticipated on the order of a handful of hours per year. The cycle of purging and retaining hydrocarbons then repeats until the charcoal carbon is exhausted. The activated carbon exhausts after some years and requires replacement. The present invention permits ready replacement of the charcoal, activated carbon, or other carbon within the canister. In operation, the present invention maximizes the air introduced into the UST and minimizes any hydrocarbons released from the UST.

Figure 4:
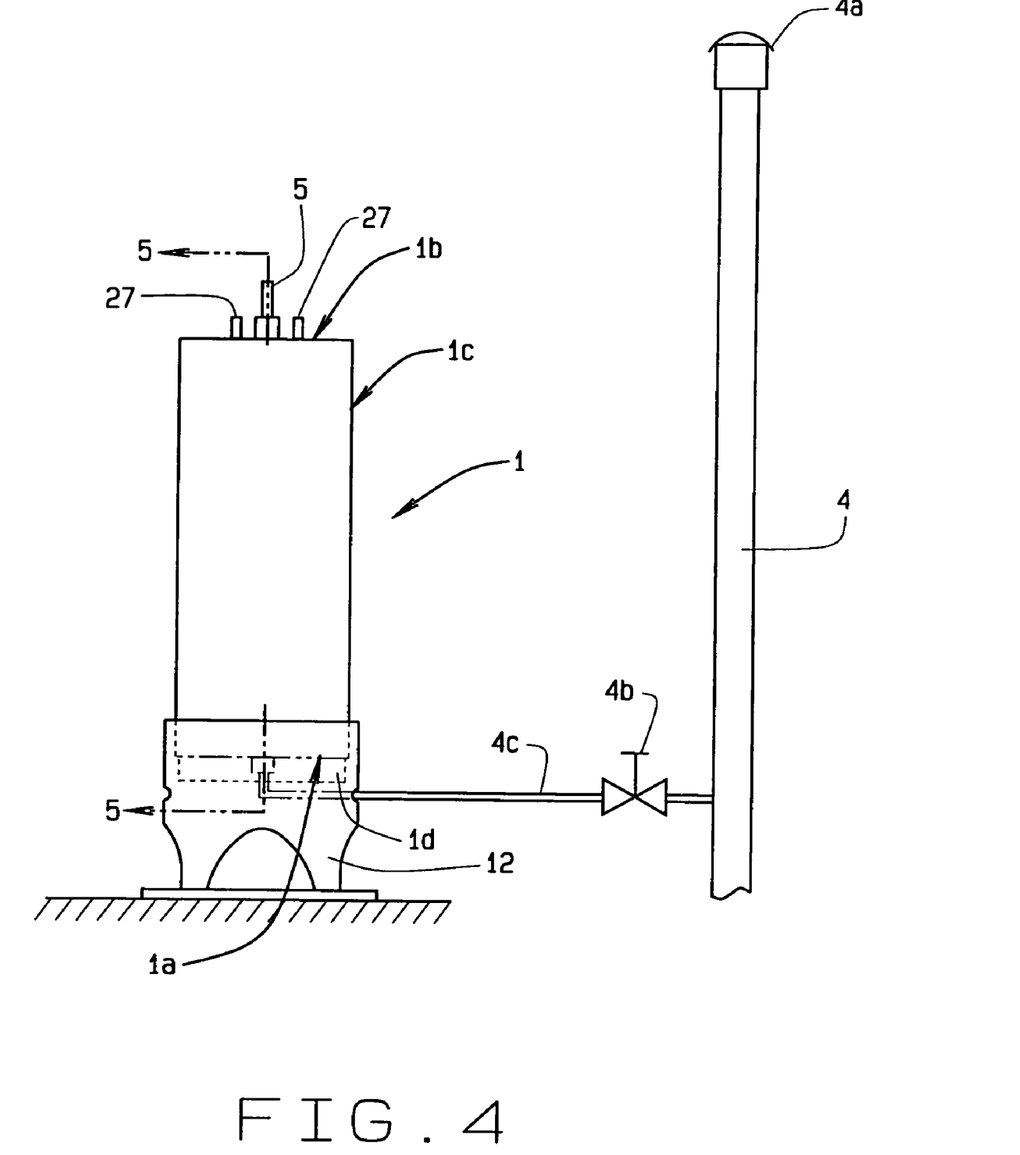
FIG. 4 shows a side view of the canister of the present invention in communication with an underground storage tank.

FIG. 4 shows the arrangement of the present invention in communication with an UST. The UST has a stack 4 generally extending upwardly and terminating with an emergency pressure relief valve 4a as described above. A line 4c extends from the stack and communicates vapors to the canister 1. The line 4c has a shutoff valve 4b outside of the canister for testing, repairs of the canister, or emergency shutoff of the system. The canister rests upon a stand 12 which generally elevates the canister above the surface and permits access to piping components below the canister. The canister has a top 1b generally located away from the surface and an opposite bottom 1a generally opposite the top. Beneath the bottom, the canister has a second bottom 1d generally inverted from the orientation of the bottom 1a. A wall 1c joins the top and the bottom forming a round cylindrical shape, preferably. Upon the top, an inlet 5 admits air into the canister when needed to purge hydrocarbon vapor from the carbon and return them to the UST. The inlet admits air generally upon pressure changes of the UST relative to ambient atmospheric pressure. Outwardly from the inlet, the top has two test ports 27 generally equally spaced upon a diameter of the top. The test ports have suitable threading or fittings to receive test equipment (not shown).

In a typical UST, a pressure vacuum valve, generally mechanical, vents the pressure and hydrocarbon emissions from a UST when the pressure reading exceeds 2.5 inches of water. However, some vapor processors, including the present invention, can release hydrocarbons when pressure exceeds a mere 0.25 inches of water. The order of magnitude reduction in pressure has concerned CARB because more hydrocarbons will be emitted by vapor processors intentionally or accidentally as vapor processors age and wear. Additionally, such low pressure discharge levels will likely bypass the pressure vacuum valves, effectively neutralizing them. Further, CARB mandates that the pressure vacuum relief valve of the UST system takes control when a vapor processor fails. The present invention provides a mechanical closing of hydrocarbon communication into a nearly saturated or saturated carbon canister and returns pressure control to the pressure vacuum valve. The present invention allows the pressure vacuum relief valve 4a to regulate hydrocarbon vapors that accumulate near or at saturation of the canister at more than 2.5 inches of water pressure.

Figure 5:
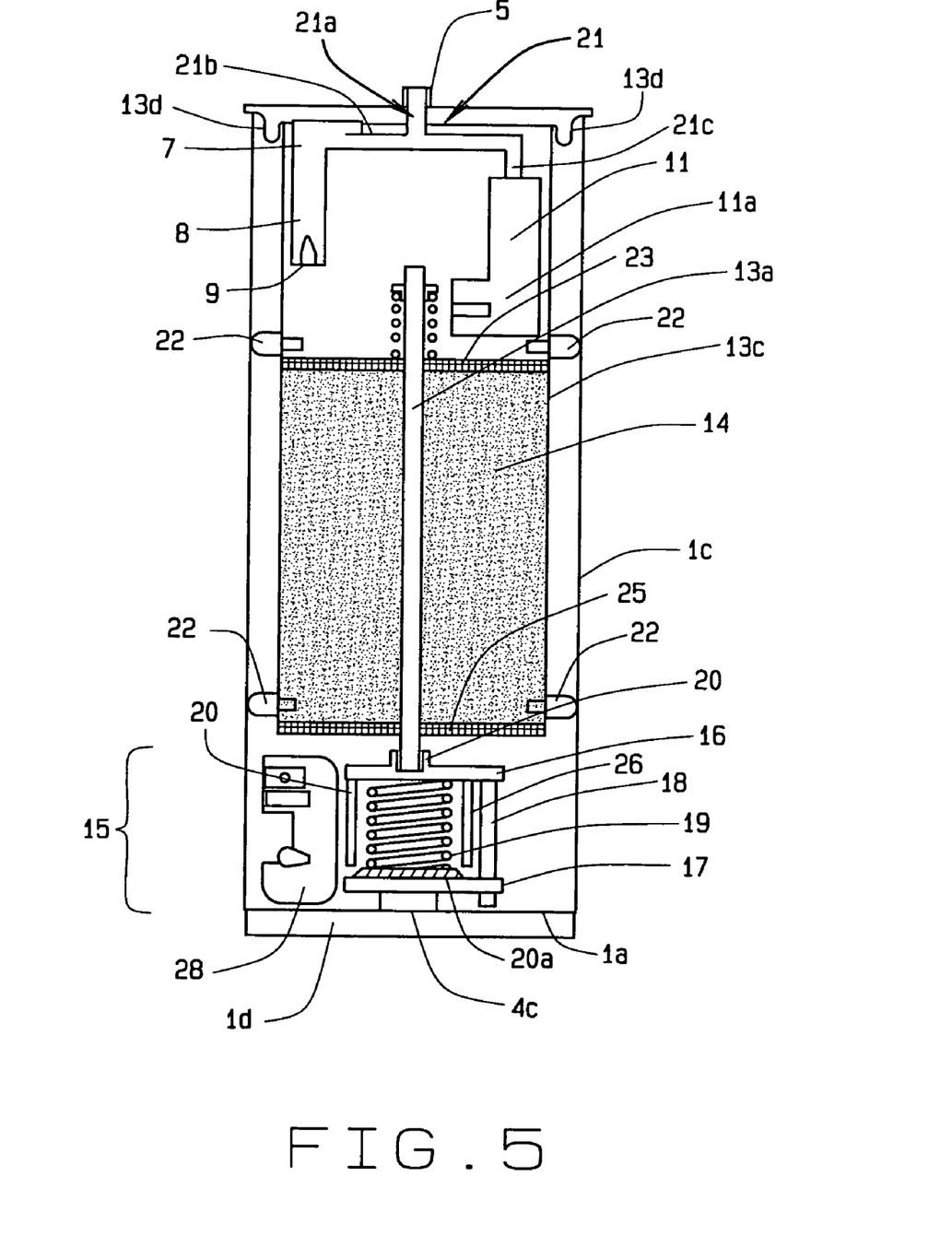
FIG. 5 shows a sectional view of the canister of the present invention.

Within the canister in this embodiment, FIG. 5 shows the valves and piping that regulate the adsorption of hydrocarbon vapors by the invention and the purging of hydrocarbon vapors with air admitted into the invention. Within the canister 1, the present invention has a generally cylindrical casing 13c that holds carbon, activated carbon, charcoal or other hydrocarbon retaining substance as at 14. The activated carbon retains hydrocarbon vapors upon the surface of the carbon pieces once introduced into the presence of the activated carbon. A rod 13a extends axially through the carbon generally upon the axis of the casing. The rod contains the carbon and hydrocarbon vapors within the canister as the rod connects the top screen 23 and the bottom screen 25 of the casing 13c. Both screens include fine mesh and coarse mesh. The casing extends upwardly from the top screen to surround the union 21. The casing seals to a diaphragm 13d upon its upper limit proximate the inlet 5. The diaphragm seal isolates the casing 13c from the wall 1c of the canister. The diaphragm seal has a generally toroid, or donut like, shape and extends around the perimeter of the casing and outwardly to the inside of the canister wall 1c.

When the activated carbon becomes saturated with hydrocarbons, air introduced into the casing strips the hydrocarbon molecules from the activated carbon for transmission back into the UST. The casing rests upon a weight sensitive valve assembly as at 15. The assembly has an upper plate 16 generally centered upon the bottom of the casing via rod 13a and an opposite base plate 17. The upper plate and the lower plate are aligned by at least two guide rods 18 generally parallel to the length of the casing. These guide rods extend through the thicknesses of both plates and have nuts, or other means, preventing the plates from slipping off the rods. Between the plates, the assembly has a biasing means, or spring 19, that maintains the plates spaced apart, at a predetermined distance, until the carbon within the casing attains a certain weight.

Generally centered upon the axis of the spring, a weight actuated valve 20 remains open as in FIG. 5 until the carbon becomes saturated. The valve has a generally cylindrical shape, here shown in section connecting to the top plate 16 and suspending above the seat 20a as later shown. The gap between the valve and the seat permits the flow of hydrocarbon vapors from the line 4c to enter the canister then pass through the bottom screen 25 into the casing. Once the carbon inside the casing becomes saturated or nearly saturated and its weight increases, the spring yields and the upper plate allows the bottom of the casing to move valve 20 to descend upon the seat 20a. The weight of the casing then closes the valve against the seat as later shown in FIG. 6 and prevents hydrocarbon vapors from entering the casing. Adjacent to the weight actuated valve, the present invention includes a secondary purge valve as at 28. The secondary purge valve receives hydrocarbon vapors from air that has passed through the carbon 14 and the bottom screen 25. The secondary purge valve then releases hydrocarbon laden vapors through the valve 20 and into the line 4c returning the hydrocarbons to the UST.

Above the casing, valves and piping regulate the flow of air and hydrocarbons into and through the casing and activated carbon as well as into and through the UST. From the top in FIG. 5, the inlet extends to a union 21 that in this embodiment has three stems, a first stem 21a communicates to the atmosphere outside of the canister. The second stem 21b, generally perpendicular to the first stem proceeds to a vacuum regulator 7 in communication with a purge valve 8 that connects with a screened intake 9. The intake 9 admits atmospheric air into the canister generally at a low pressure and when the vacuum regulator 7 opens. The second stem, cooperating with the purge valve, draws atmospheric air through the first stem and into the interior of the canister for purging of hydrocarbon vapors from the saturated carbon and returning them to the UST.

Opposite the second stem, a third stem 21c, also perpendicular to the first stem, releases treated air from the canister to the atmosphere. The third stem has a pressure regulator 11 in communication with an outlet valve 11a, shown below the intake 9, however, other locations are anticipated.

Figure 5A:
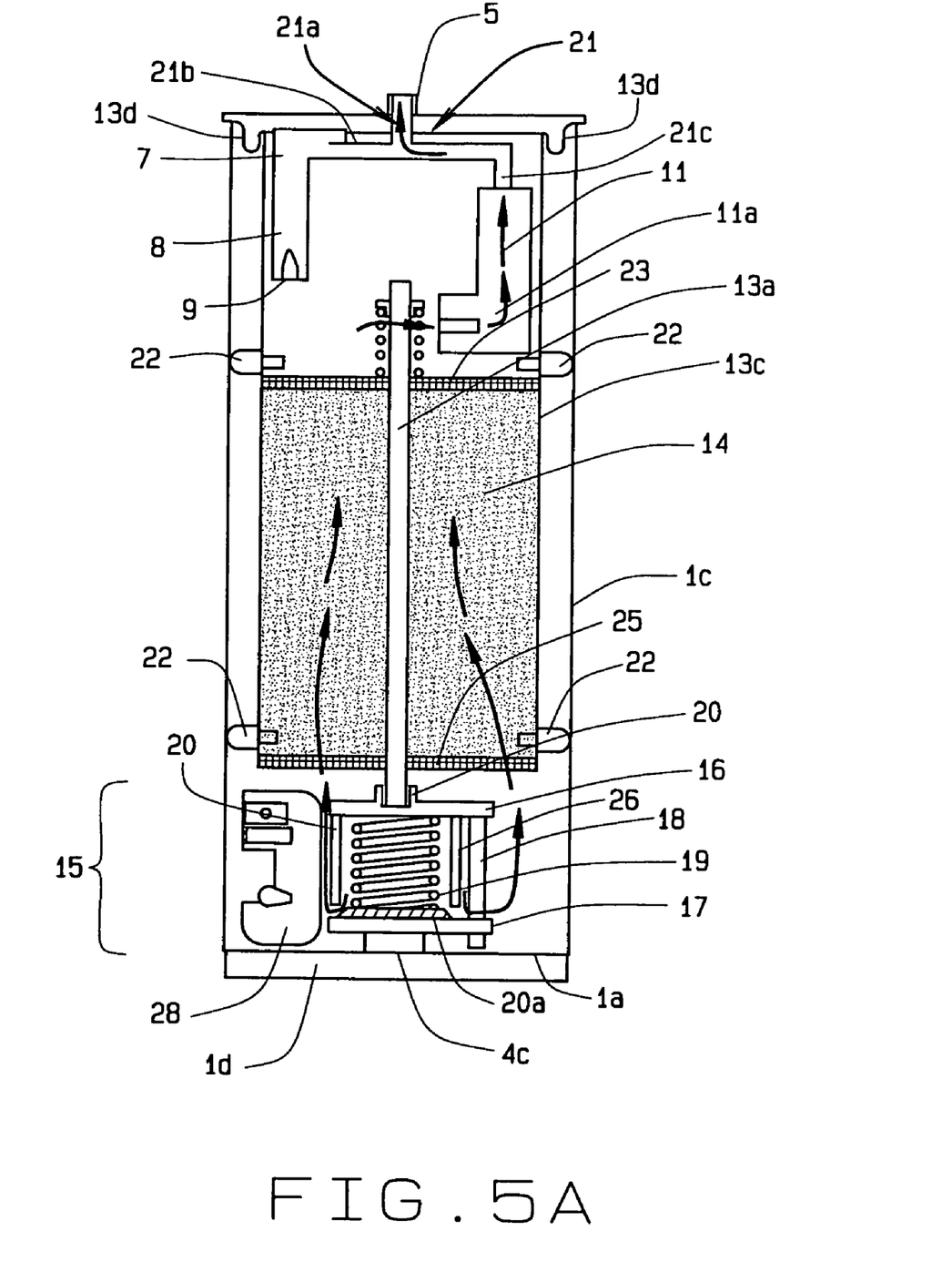
FIG. 5a shows a sectional view of the canister and flow lines during loading.

The present invention uses the loaded weight of the activated carbon 14 within the casing 13c to close the main check valve, as at 20, and to revert pressure control back to the P/V vent valve, as at 4a. When the UST operates at a sufficient negative pressure, the secondary purge valve 28 opens. The secondary purge valve then returns just enough hydrocarbons to the UST that lightens the canister enough to open the main valve 20. As the main valve returns to an open state, as in FIGS. 5, 5A, the present invention assumes pressure control from the P/V valve and then purges itself at a higher rate. This cycle then repeats at each instance when the carbon 14 within the casing 13c becomes overloaded and overweight with hydrocarbons.

To utilize the present invention, an operator connects the UST line 4c to the bottom 1a of the canister 1. Then the inlet 5 is opened to the atmosphere. In operation, the present invention operates in fluid communication with the UST. The present invention operates in five modes: 1) normal loading, 2) shutoff, 3) secondary purging, 4) normal purging, and 5) no flow.

Due to evaporating fuel, barometric pressure changes, and like events, the UST accumulates hydrocarbon vapors under higher pressure. The higher pressure affects the canister of the present invention and normal loading mode takes place when the UST pressure equals or exceeds 0.25 inches of water. The pressure regulator 11 opens and draws hydrocarbon laden air from the UST into the line 4c and up through the bottom screen then through the activated carbon inside the casing 13c. The activated carbon 14 filters all of the hydrocarbons from the influent vapors and allows clean air to exit from the inlet 5 as in the flow lines of FIG. 5a. As the activated carbon adsorbs hydrocarbons, the weight of the casing, including the activated carbon, increases. Once the weight of the casing and activated carbon reaches a critical amount, the main valve 20 begins to close.

Figure 6:
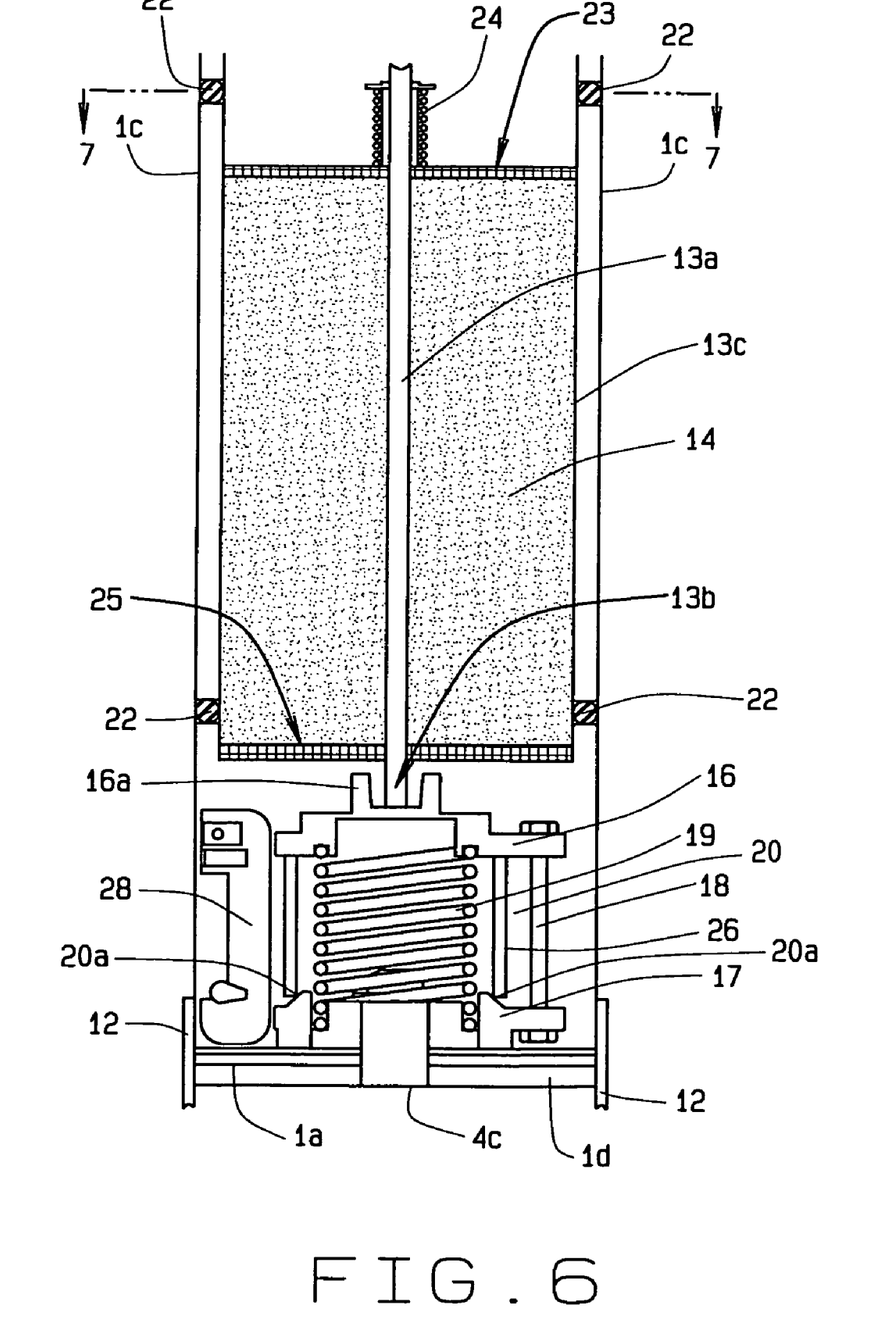
FIG. 6 shows a detailed sectional view of the canister and the weight actuated valve; and, FIG. 7 provides a top view of the canister of the present invention within the casing.

At shutoff, the main valve closes as in FIG. 6. The weight of the casing and activated carbon exceed the critical amount causing the spring 19 to compress and close the valve 20. Upon closing the valve, the present invention interrupts fluid and vapor communication to the UST and pressure control returns to the P/V vent 4a. As a safety and pollution control mechanism, the activated carbon requires minimum purging so that the present invention regains pressure control from the P/V vent.

Figure 5B:
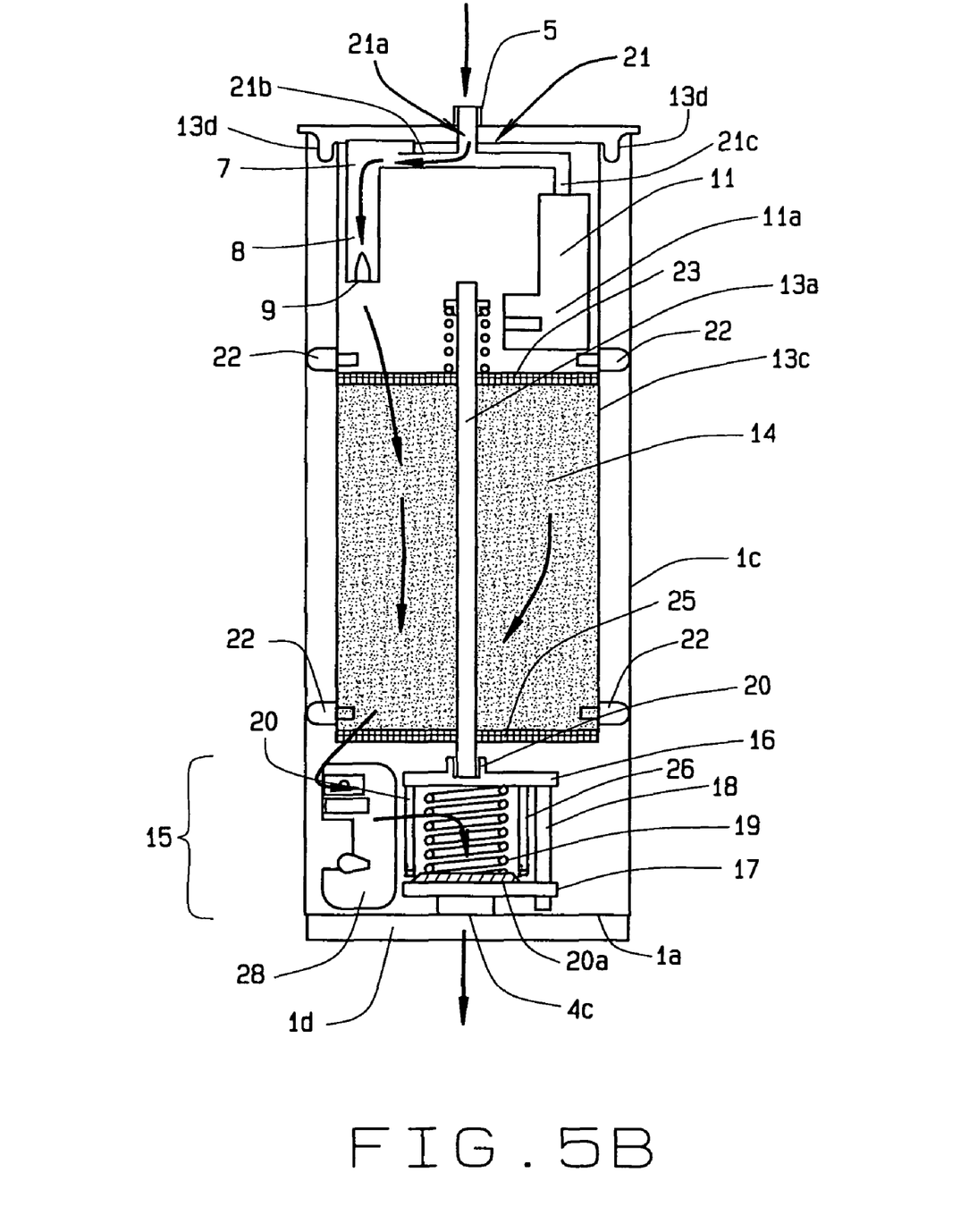
FIG. 5b shows a sectional view of the canister and flow lines during secondary purging.

As shown in FIG. 5B, the secondary purge valve 28 opens as the main valve remains closed from shutoff. The secondary purge valve admits just enough air to purge the carbon at a low rate, shown by the flow lines. Generally the secondary purge valve opens when the UST pressure reaches −1.75 inches of water or less. Once approximately ½ pound of hydrocarbons have been purged and returned to the UST, the main valve 20 opens and normal purging occurs.

Figure 5C:
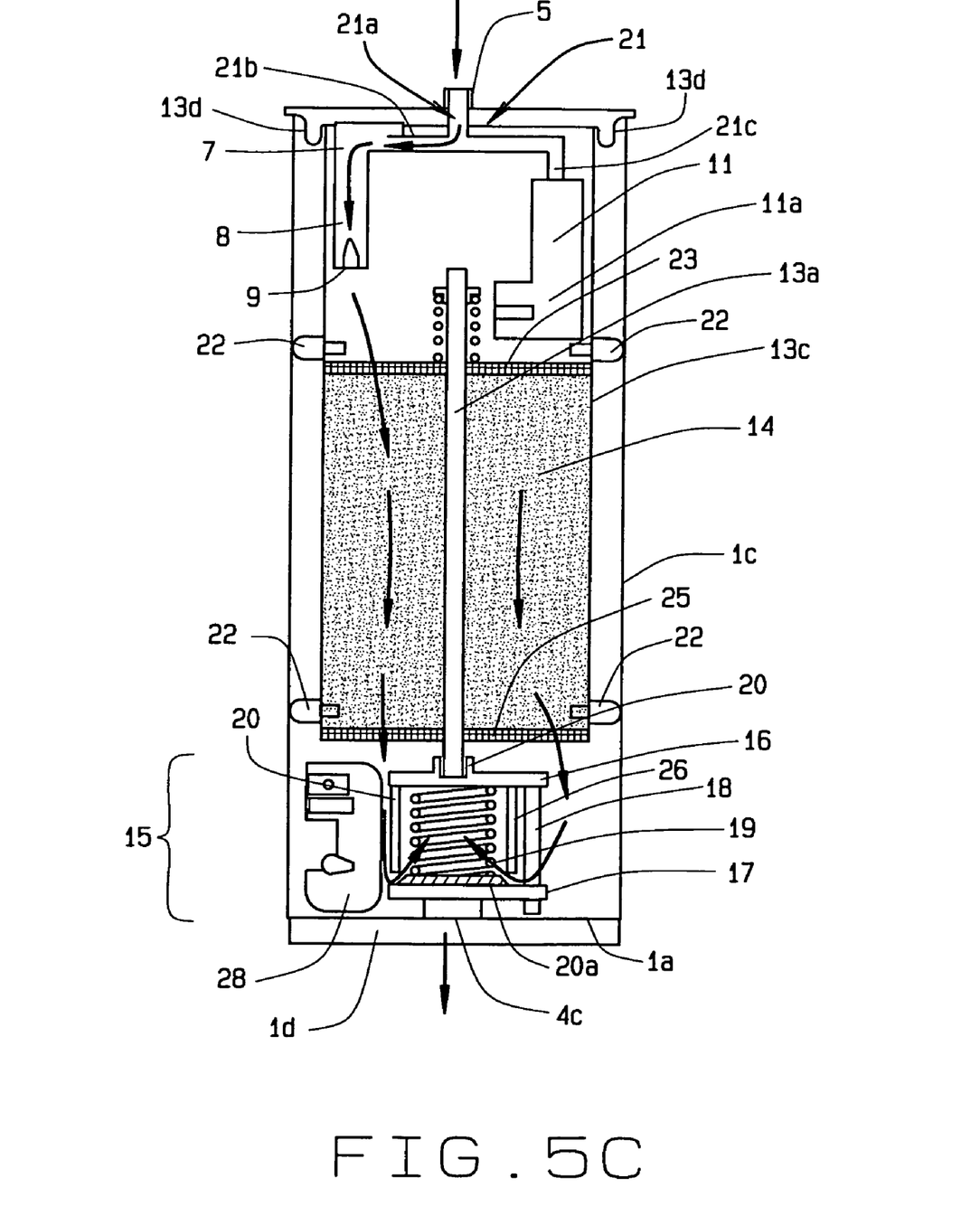
FIG. 5c shows a sectional view of the canister and flow lines during normal purging.

During normal purging, incoming atmospheric air purges the activated carbon at a higher rate than in secondary purging, as shown by the flow lines in FIG. 5c. After a few refuelings, the pressure drops in the UST and in the line 4c and thus in the canister 1. The vacuum regulator 7 detects the pressure drop and opens to admit air through the intake 9 within the casing 13c, out the bottom screen 25, and then into the line 4c. The air passing through the carbon of the canister strips any hydrocarbons therein and returns them to the UST. The normal purging reduces the overall weight of the casing by removing hydrocarbons from within the activated carbon. In doing so, the normal purging keeps the main valve 20 open. Generally normal purging occurs and the main valve opens when the UST pressure reaches approximately −1.50 inches of water or less.

Once the pressure stabilizes in the UST, the vacuum regulator closes, stopping the inflow of air into the canister. And no flow occurs within the present invention when the UST has a pressure between approximately +0.25 inches and approximately −1.5 inches of water. Within this pressure range, the present invention does not allow flow of air or hydrocarbon vapors into or out of the canister, even if the main valve 20 is open. The present invention manages the UST pressure within an optimal range to comply with CARB daily average pressure requirements and to optimize vapor recovery performance at the fill neck interface.

However, some vapor processors, when the carbon is saturated, can release hydrocarbon emissions when pressure exceeds approximately +0.25 inches of water. This low pressure release has concerned governmental regulators due to higher hydrocarbon emissions either intentionally or accidentally. Such low pressure discharge levels will likely bypass the pressure vacuum valves, effectively neutralizing them. Further, CARB mandates that the pressure vacuum valve of a vapor processor operate when a vapor processor fails. The present invention has a weight actuated valve 20 that prohibits hydrocarbon vapors from entering the canister when the carbon is near or at saturation. The weight sensitive valve in cooperation with the pressure regulator valve 11 controls hydrocarbon vapors admitted into the canister at pressures less than approximately 0.25 inches of water. Following purging of hydrocarbon vapors from the canister, the cleansed air from the canister is then admitted through the outlet valve 11a, on into the union, and to the atmosphere through inlet 5. Once the pressure again stabilizes in the UST, the pressure regulator closes the outlet valve.

In more detail, FIG. 6 shows the casing 13c of the carbon 14 and the weight actuated valve 20 beneath it. Inside of the canister wall 1c, the casing has a generally cylindrical form. The bottom of the canister has a central aperture that admits the rod 13a through the bottom screen 25 and into the casing. Opposite the bottom of the canister, the casing has a top screen 23 upon the carbon. The top screen 23 has a central aperture so that it can slide upon the rod 13a. The casing remains generally centered within the canister by a plurality of guide posts 22, generally located above the top screen and above the bottom screen. A spring 24 locates coaxially upon the rod 13a and upon the top screen. The spring 24 extends from a support downwardly upon the threaded rod and induces pressure upon the carbon that assists in the adsorption of hydrocarbon vapors. Opposite the top, the casing has a round bottom screen 25 that serves as a floor for the carbon and that admits hydrocarbon vapors. The canister also has an aperture that admits the other end of the rod, as a stem 13b. This stem 13b rests freely on a beveled outer surface that engages the weight actuated valve 20. When the carbon is near or at saturation, the casing compresses the spring 19 and descends. In descending, the casing guides the stem 13b to push the valve 20 upon the seat 20a. Following the stem contacting the valve and pushing it on the seat in a tight fit, normal transmission of hydrocarbon vapors into the canister and the casing ceases.

The upper plate 16 has a centered and raised portion, as at 16a, extending into and towards the interior of the casing. The centered raised portion fits around and over the valve 20. Beneath the upper plate 16, the spring 19 is coaxial with the UST line entering the canister. The spring is located within the valve 20, generally a cylindrical wall as at 26 that prevents accumulation of debris and other contamination upon the wraps of the spring. The spring has a coefficient, k, and a length that operate such that when the known weight of carbon within the casing is near or at saturation with hydrocarbons and the apparent weight of the carbon increases, the spring compresses allowing the valve to close upon the seat. As before, the spring rests upon the base plate 17. The base plate and the upper plate maintain alignment using the guide rods 18 that guide movement of the upper plate vertically under the action of the spring 19. The weight actuated valve assembly rests upon the outlet fitting 4c proximate the canister which is joined at the base plate 17 to the bottom 1a of the canister which is then connected to the stand 12 for positioning on the UST line 4c near a UST at a GDF.

Figure 7:
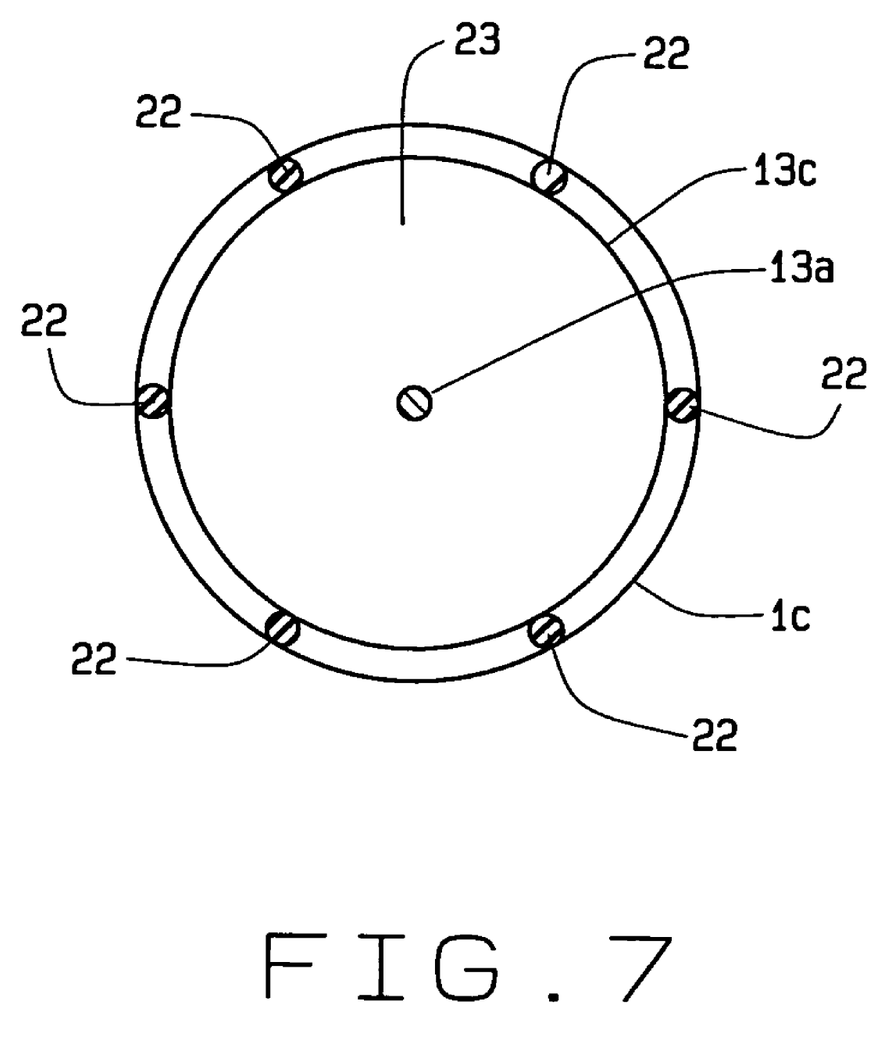

FIG. 7 shows a top view of the canister 1c with the casing 13c spaced away from the canister using a plurality of guideposts 22. The guideposts are generally equally equally spaced around the perimeter of the casing. Though six guideposts are shown, the invention can operate upon a minimum of three guideposts equally spaced apart.

From the aforementioned description, a carbon canister with valve activated by weight of nearly saturated or saturated carbon has been described. The weight activated canister is uniquely capable of containing hydrocarbon vapors, returning them to a UST, and operating at pressures with the range of approximately +0.50 inches of water and less than approximately −2.00 inches of water. The canister and its various components may be manufactured from many materials including but not limited to polymers, high density polyethylene HDPE, polypropylene PP, polyethylene terephalate ethylene PETE, polyvinyl chloride PVC, polystyrene PS, nylon, steel, charcoal, activated charcoal, activated carbon, ferrous and non-ferrous metals, their alloys, and composites.

We claim:

1. A device for cleansing hydrocarbon vapors and other contaminants comprising:
   a casing containing carbon therein, having a screened bottom and an opposite screened top, said bottom receiving hydrocarbon vapors from a hydrocarbon source;
   a weight actuated valve locating beneath said casing, said valve closing when said casing attains a predetermined weight including hydrocarbons;
   an assembly locating opposite said weight actuated valve and in fluid communication with said casing, said assembly drawing air into said casing when the hydrocarbon source has attained a low pressure of approximately −1.5 inches of water;
   a secondary purge valve locating proximate said weight actuated valve, said secondary purge valve opening upon detecting pressure in the hydrocarbon source below approximately −1.75 inches of water when said weight actuated valve has closed, then said secondary purge valve admitting air into said casing, said secondary purge valve returning purged hydrocarbon vapors from said carbon through said weight actuated valve into said hydrocarbon source, and said weight actuated valve reopening upon said casing falling below the predetermined weight; and,
   a canister containing said casing, said weight actuated valve, and said assembly, said canister being in fluid communication with said hydrocarbon source and allowing said assembly fluid communication to the atmosphere;
   wherein the inflow of air through said canister into said casing purges the carbon of hydrocarbons and the outflow of air from said casing through said canister draws vapors from the hydrocarbon source through said casing for adsorption by the carbon;
   wherein said weight actuated valve signals said assembly to control release of hydrocarbon vapors and intake of air using pressure; and,
   wherein the repetitive inflow of air through said casing regenerates the carbon.

2. The hydrocarbon vapor cleansing device of claim 1 further comprising:
   said canister having an inlet in communication with said assembly and an opposite outlet in communication with said weight actuated valve;
   said assembly having a union having three stems in mutual communication, a first stem in communication with said inlet, a second stem in communication with said first stem and having a vacuum regulator in communication with a purge valve, said vacuum regulator opening to admit air into said casing upon detecting a low pressure of approximately −1.5 inches of water within the hydrocarbon source, and a third stem in communication with said first stem and having a pressure regulator in communication with an outlet valve, said pressure regulator opening to release air cleansed of hydrocarbon vapors when a high pressure within said casing is detected;
   wherein said assembly prevents flow through the inlet for pressures in the hydrocarbon source in the range of approximately +0.25 inches of water to approximately −1.50 inches of water.

3. The hydrocarbon vapor cleansing device of claim 1 further comprising:
   a line connecting to said canister then to a valve which communicates to a vent stack, said vent stack in communication with the hydrocarbon source and including a pressure vacuum relief valve above said line.

4. The hydrocarbon vapor cleansing device of claim 1 further comprising:
   a rod, generally centered within said casing and extending lengthwise through said casing, said rod connecting to said screened bottom;
   said screened top admitting said rod and securing to said canister upon its perimeter, said rod having a biasing mechanism supplying a downward force upon said screened top and pressure upon said carbon within said casing; and,
   said weight actuated valve having a base plate upon said bottom of said canister and upon said outlet to said canister, a spring upon said base plate, an upper plate opposite said base plate and above said spring, and at least one guides parallel to the length of said casing, upon which said base plate and said upper plate slidingly engage.

5. The hydrocarbon removing device of claim 1 wherein said substance is selected from one of carbon, activated carbon, charcoal, or activated charcoal.

6. A device to remove hydrocarbon vapors from air discharged from a hydrocarbon source under ambient atmospheric pressure conditions while retaining control by a pressure relief valve during lower ambient pressure, comprising:
   a casing containing a substance adapted to remove hydrocarbon vapors from air wherein the inflow of air into said casing purges said substance of hydrocarbons and the outflow of air from said casing draws vapors from the hydrocarbon source through said casing for adsorption by said substance, wherein the repetitive inflow of air through said casing regenerates said substance;
   said casing having a screened bottom and an opposite screened top, and a rod extending through the centers of said screened bottom and said screened top;
   a weight actuated valve locating beneath said casing, said valve closing when said casing attains a predetermined weight of said substance including adsorbed hydrocarbons;
   an assembly locating within said casing and opposite said weight actuated valve locating outside said casing and in fluid communication with said casing, said assembly drawing air into said casing when said weight actuated valve has opened and the hydrocarbon source has attained a low pressure or when said weight actuated valve has closed and said casing has attained a lower pressure than atmospheric pressure;

a secondary purge valve locating proximate said weight actuated valve, said secondary purge valve opening upon detecting pressure in the hydrocarbon source below approximately −1.75 inches of water then admitting air when said weight actuated valve is closed, and directing purged hydrocarbon vapors through said weight actuated valve into said hydrocarbon source wherein said weight actuated valve reopens upon said casing falling below the predetermined weight; and, a canister containing said casing, said weight actuated valve, and said secondary purge valve, said canister being in fluid communication with said hydrocarbon source and allowing said assembly fluid communication to the atmosphere, and said casing having a diaphragm seal to said canister opposite said hydrocarbon source;

wherein said assembly prevents flow through the inlet for pressures in the hydrocarbon source in the range of approximately +0.25 inches of water to approximately −1.5 inches of water.

7. The hydrocarbon removing device of claim 6 further comprising:

said canister having an inlet in communication with said assembly and an outlet in communication with said weight actuated valve;

said assembly having a union including three stems in mutual communication, a first stem in communication with said inlet, a second stem in communication with said first stem and having a vacuum regulator in communication with a purge valve, said vacuum regulator opening to admit air into said casing upon detecting a low pressure of approximately −1.5 inches of water within the hydrocarbon source, and, a third stem in communication with said first stem and having a pressure regulator in communication with an outlet valve, said pressure regulator opening to release air cleansed of hydrocarbon vapors upon detecting a lower pressure within said casing.

8. The hydrocarbon removing device of claim 6 further comprising:

a line communicating to said canister and then communicating to a vent stack, said vent stack communicating with the hydrocarbon source and including a pressure vacuum relief valve above said line.

9. The hydrocarbon removing device of claim 6 wherein said substance is selected from one of carbon, activated carbon, charcoal, or activated charcoal.

10. The hydrocarbon removing device of claim 7 further comprising:

said device processing vapors from the hydrocarbon source during normal loading at a pressure in the hydrocarbon source at least +0.25 inches of water;

said assembly shutting off flow through said device upon closure of said weight actuated valve by said canister achieving a predetermined weight;

said device performing secondary purging of said canister using said secondary purge valve at a pressure in the hydrocarbon source of at least −1.75 inches of water upon said weight actuated valve remaining closed;

said device then performing normal purging at a pressure in the hydrocarbon source of at least −1.50 inches of water when said weight actuated valve is open; and, said device operating in a no flow state at a pressure in the hydrocarbon source in the range of approximately +0.25 inches of water to −1.5 inches of water.

* * * * *